US007318128B1

(12) United States Patent
Dice

(10) Patent No.: US 7,318,128 B1
(45) Date of Patent: Jan. 8, 2008

(54) METHODS AND APPARATUS FOR SELECTING PROCESSES FOR EXECUTION

(75) Inventor: David Dice, Foxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 704 days.

(21) Appl. No.: 10/633,258

(22) Filed: Aug. 1, 2003

(51) Int. Cl.
*G06F 12/06* (2006.01)
(52) U.S. Cl. .................. 711/151; 711/158; 718/102
(58) Field of Classification Search .......... 711/151, 711/158, 152; 718/102, 103, 108
See application file for complete search history.

(56) References Cited

U.S. PATENT DOCUMENTS

| 5,826,079 | A  | * | 10/1998 | Boland et al. ............... | 718/102 |
| 5,826,081 | A  | * | 10/1998 | Zolnowsky .................. | 718/102 |
| 6,269,390 | B1 | * | 7/2001 | Boland ........................ | 718/102 |
| 6,269,391 | B1 | * | 7/2001 | Gillespie .................... | 718/100 |
| 6,289,369 | B1 | * | 9/2001 | Sundaresan ................. | 718/100 |
| 6,728,959 | B1 | * | 4/2004 | Merkey ....................... | 718/102 |
| 6,832,266 | B1 | * | 12/2004 | Shaylor ....................... | 719/328 |
| 7,107,593 | B2 | * | 9/2006 | Jones et al. ................. | 709/226 |

OTHER PUBLICATIONS

Vaswani et al. The Implications of Cache Affinity on Processor Scheduling for Multiprogrammed Shared Memory Multiprocessors ACM 1991.*
Salehi et al., "The Effectiveness of Affinity-Based Scheduling in Multiprocessor Newtorking," 1996, pp. 215-233, IEEE.*
Marek Kubale, Preemptive scheduling od duoprocessor tasks on dedicated processors to minimize schedule length, IEEE electronic library, pp. 33-41, Apr. 1995.*
Black, D., "Scheduling Support for Concurrency and Parallelism in the Mach Operating System", Computer, 23, 35-43, (May 1990).*
Lo, S., et al., "A Comparative Analysis of Multiprocessor Scheduling Algorithms", IEEE : 7th International Conf. on Distributed Computing Systems, Berlin, Germany, 356-363, (Sep. 21-25, 1987).*
Tucker, A., et al., "Process Control and Scheduling Issues for Multiprogrammed Shared-Memory Multiprocessors", Proc.: 12th ACM Symp. on Operating Systems Principles, 23, Litchfield Park, Arizona, 159-166, (Dec. 3-6, 1989).*

(Continued)

*Primary Examiner*—Pierre-Michel Bataille
(74) *Attorney, Agent, or Firm*—Chapin IP Law, LLC; Barry W. Chapin, Esq.

(57) ABSTRACT

Mechanisms and techniques operate in a multiprocessing computer system having a plurality of processing devices and provide an affinity-based wakeup locality successor selection process that can identify processes to be executed by a kernel by detecting when a first process executing on a first processing device releases access to shared data. In response to the first process releasing access to the shared data, embodiments attempt to identify a second process that i) formerly executed on the first processing device and that ii) is awaiting access to the shared data. Embodiments provide, to a kernel responsible for selecting processes to execute amongst the plurality of processing devices, an identification of the second process as a process that is ready for execution in the multiprocessing computer system. Such embodiments can operate in an execution environment such as a Java Virtual Machine.

45 Claims, 4 Drawing Sheets

OTHER PUBLICATIONS

Zahorjan, J., et al., "Processor Scheduling in Shared Memory Multiprocessors", Proc. 1990 Conf. on Measurement & Modeling of Computer Systems, Boulder, CO, 214-225, (May 22-25, 1990).*

Vaswani et al. The Implications of Cache Affinity on Processor Scheduling for Multiprogrammed Shared Memory Multiprocessors ACM 1991.*

* cited by examiner

METHODS AND APPARATUS FOR SELECTING PROCESSES FOR EXECUTION

BACKGROUND

Conventional multiprocessor computer systems include multiple processing devices that are each capable of executing sequences of instructions, called threads, concurrently with other processing devices. The individual processing devices in a conventional multiprocessing computer system may be separate microprocessor chips interconnected via a data bus or other circuitry, or the processing devices may reside as respective "cores" (e.g., processing circuits) on a single "die" (i.e., one physical microchip). If each respective processing device is a separate physical chip, each chip may include instruction processing circuitry as well as an on-board memory or local cache and an associated cache controller. When multiple core processing devices reside on a single chip or die, each processing core may include its own respective instruction processing circuitry allowing concurrent execution of threads with other cores on the same chip, but the cores on the same die may share a common cache of memory. Examples of multiprocessing computer systems are workstations manufactured by Sun Microsystems of Palo Alto, Calif., USA that can contain as many as 256 Scalable Processor Architecture (SPARC) processors. An example of a multiprocessing computer chip containing multiple processing cores on a single processor die that share a common cache is the Intel Pentium-4 line of microprocessors containing Hyper-Threading technology. Pentium-4 and Hyper-Threading are registered U.S. trademarks of Intel Corporation.

Generally, a conventional processing device often uses a local cache memory system to store data and other information related to the execution of a particular thread of instructions that execute on that processing device. As the processing device executes the thread of instructions of a software program, a cache controller in the processing device stores data, such as values for variables and/or other execution state information associated with the thread, in the cache for faster access when this information is needed during execution of that thread.

Conventional operating systems that operate within multiprocessing computer systems include a kernel that is capable of scheduling various threads that are ready for execution on the processing devices. Generally, the kernel can provide an execution time slot for a thread to execute on a processing device. When the time slot or an executing thread has expired, or if some other event such as an interrupt or a change in thread priority occurs, the kernel can remove or preempt the executing thread from execution on the processing device and can select and resume execution of another thread on that processing device. The kernel can perform this repetitive scheduling process involving thread selection and execution in a continuous manner for all processing devices in the multiprocessing computer system so that when a thread on one processing device is blocked from execution for some reason (e.g., because its timeslot ended, or it became blocked awaiting access to shared memory or an input-output device or for some other reason), the kernel can select another thread for execution on that processing device. In this manner, each thread of instructions that is awaiting its chance to execute is scheduled by the kernel to execute on a processing device.

A thread may execute on one processing device for one period of time until thread preemption occurs. When the kernel schedules that thread for execution again, the kernel may execute that thread on different processing device than the original processing device that formerly executed that thread. This is called thread migration. Thread migration may happen, for example, if at the time of scheduling the thread for re-execution, the original processing device is now busy executing another thread but the different processing device is now available for execution of a thread.

After preemption of a thread from execution on a processing device, the cache memory associated with that processing device continues to maintain or store execution state of the pre-empted thread until that specific cache memory space is overwritten during execution of another executing thread (i.e., executing on the same processing device, or on another core that also uses that cache area). Due to the large size of modern cache memory systems associated with conventional processing devices, there may be areas of the cache containing state information from execution of a first thread that are not overwritten during execution of a second thread. In other words, just because a kernel preempts a first thread and causes a processing device to execute a second thread, upon preemption of the second thread, portions of the cache associated with that processing device may still contain some or even all of the state information stored during the former execution of the first thread. Modern operating system designers have recognized this fact and have created kernels that provide for "affinity-based" scheduling.

Generally, conventional affinity-based thread scheduling recognizes that there is a good chance that a pre-empted thread may be able to re-use some execution state information maintained in a cache (i.e., that was not overwritten during execution of another thread) if that thread is again executed on a processing device associated with that cache. As such, using conventional affinity-based scheduling, a thread that executes on the same processing device as was used for prior execution of that same thread may avoid cache "misses" that would otherwise be needed to populate the cache with the threads "working data".

When a thread resumes execution on a processing device (e.g., a CPU), that thread experiences a "cache reload transient" (CRT) as it builds up its "working set" of data the cache of the processor that is currently executing that thread. During the CRT time period the thread incurs a higher cache miss rate than it would if the thread had simply remained executing on the CPU (and had not blocked itself or been preempted). If the thread executed recently on that same CPU prior to preemption, then statistically the CRT should be short/small. Affinity-based scheduling attempts to minimize the CRT penalty. When a thread running on processing device "A" causes a cache miss, the cache line might be in main memory, or alternately if the thread ran recently on some other processing device "B," the cache line might be in write-back cache attached to processor "B". In this case, processor "B" can either perform a cache-to-cache transfer of the cache line from processor "B" to processor "A" (if the system is designed to support cache-to-cache transfers), or processor "B" can write the cache line into main memory and processor "A" can stall, waiting for "B"'s write to main memory to complete. Both methods (direct cache-B-to-cache-A transfer, or cache-B-to-memory followed by memory-to-cache-A) involve interconnect traffic that consumes precious shared bandwidth which can affect the overall throughput of the computer system and latency for the specific thread that caused the cache miss.

In a conventional kernel that uses affinity-based scheduling in a multiprocessing computer system, the kernel thus attempts to restart a pre-empted thread on a processing device that is associated with the same cache that stored the execution state information for that thread during its former execution. In the case of symmetric multiprocessing computer system designs containing individual processing devices each having their own associated cache (i.e., each processing device is a separate chip), a conventional kernel applies affinity-based scheduling and attempts to restart a preempted thread on that same processing device. In the case of processing devices that are separate cores on a single die that share a common on-board cache, conventional kernels attempt to apply affinity-based scheduling to restart the pre-empted thread on any processing device core that accesses the same cache as the core that formerly executed that thread. This may be a different core on the same chip.

Note that conventional affinity-based scheduling is a best-efforts approach to attempt to have threads that execute using one cache, but that are then preempted, to again use that same cache when they begin execution again. By "best-efforts," what is meant is that the kernel is not bound by the affinity of a thread to a particular cache. Thus, if a pre-empted thread is ready for execution (e.g., its interrupt completed) but the processing device on which that thread formerly executed is busy executing another thread (e.g., of equal or higher priority to the thread that is now ready for execution), then the kernel will typically override the affinity-based scheduling decision and chose to execute that thread on another available processing device with no thread currently executing.

SUMMARY

Conventional mechanisms and techniques for selecting threads for execution on processing devices in a multiprocessing computer system suffer from a variety of deficiencies. In particular, conventional kernels that utilize affinity-based selection mechanisms for selecting a successor thread to execute in response to a preemption of some currently executing thread do not take into account certain aspects of what the currently executing thread does during its execution when making a decision on successor thread selection. In particular, conventional kernels that use conventional affinity-based selection techniques do not consider whether or not the pre-empted thread accesses shared memory during execution, nor do conventional kernels consider shared memory access behavior patterns when choosing successor threads to execute. Embodiments of the invention are based in part on the observation that runtime execution characteristics that a thread exhibits during its execution prior to preemption can be used to effect affinity-based selection of successor thread execution in order to provide increased performance during execution of the successor thread, as will be explained.

Certain conventional software execution environments control synchronization and mutual exclusion to shared memory areas between a set of threads that require access to the shared memory. As an example, a Java Virtual Machine (JVM) or similar execution environment provides synchronization and mutual exclusion primitives based on "monitors" used to control access to shared memory. Only one thread may "own" a monitor at any given time and thus that thread has access to a region of shared memory associated with the monitor. Other threads that try to acquire the monitor in order to access shared memory must block or stall until the owner thread releases the monitor.

A typical conventional JVM uses a synchronization subsystem to control access to monitors, and implements each monitor with an associated first-in first-out (FIFO) list or queue of blocked threads that are awaiting access to the monitor. When an owning thread releases the monitor, the conventional JVM (i.e., the synchronization subsystem) selects the next successor thread in the queue of waiting threads and then "activates" that successor thread. By activates, what is meant is that the JVM indicates to the kernel that the next successor thread in the queue of blocked threads is ready for execution by placing the thread in the kernel's "ready" queue. Threads on the ready queue are runnable or eligible for execution by the operating system kernel. The kernel scheduler decides which of the ready threads will be assigned to a processing device and also decides which particular processing device the selected ready thread will run on and for what time duration that thread will execute. To this end, the JVM provides a synchronization subsystem that manages thread state transitions from running to blocked and from blocked to ready, while the operating system kernel provides a scheduler that manages thread state transitions from ready to running and from running to ready. In conventional implementations of the JVM and multiprocessing operating system kernels, selection of successor threads by the synchronization subsystem for access to shared data and the subsequent kernel scheduling activities involving ready threads are separate operations implemented independently of one other. Due to this fact, inefficiencies exist in conventional implementations of JVM's operating in conjunction with conventional multiprocessing kernels.

Conventional kernel schedulers have access to and utilize a thread's recent execution history, that identifies which processing device the thread last ran on and when (i.e., how long ago) the thread was last run, to determine which processing device a ready thread should next be assigned to for execution. If a thread recently executed on a processing device, it is likely that some of the cache lines required by that thread are still resident in that processing device's associated cache. As noted above, if a conventional kernel assigns a thread for execution to a processing device to which the thread has "affinity" using conventional affinity-based scheduling, that thread will execute more efficiently since some of its cache state is likely already present in the cache.

Certain inefficiencies exist with conventional mechanisms and techniques for performing the affinity-based scheduling of threads within conventional multiprocessing kernels. While conventional kernel schedulers exploit affinity information to assign threads to CPUs, current conventional successor selection implementations such as those used in JVM's are affinity-unaware (e.g., use a simple first-in-first-out list or queue).

Conventional process or thread scheduling suffers from rapid monitor migration. A monitor and its associated shared data migrate between processing devices if an acquiring thread (i.e., a successor thread that is chosen for execution and then acquires the monitor to access the shared data) executes on a processing device other than the processing device that executed a thread that performed the prior release of the monitor for that same shared data. Monitor migration means that cache and memory subsystems in the computer system must move the shared data from the previous thread owner's processing device cache to the new thread owner's processing device cache. Conceptually, the shared data "follows" or migrates to the cache of the processing device of the thread that owns the monitor. Migration is undesirable because it consumes inter-processor data bus bandwidth on the system interconnect within a multiprocessing computerized device.

Embodiments of the invention significantly overcome this and other deficiencies associated with conventional thread scheduling and successor selection mechanisms and techniques. Embodiments of the invention provide mechanisms and techniques that are capable of biasing a kernel successor selection mechanism's successor thread selection or choice in order to cause the kernel to preferentially select threads that executed on the same processing device as a thread that is releasing a monitor for access to shared data, as detected by a synchronization subsystem used for successor selection configured in accordance with embodiments of this invention. The processing of this invention is generally referred to herein as "wakeup locality" since when a successor thread "wakes up" and begins execution, the processing device upon which it is executing has been preferentially chosen (by the system of the invention) so that the cache of the processing device contains remnants of the monitor and shared data already in the cache due to prior execution of a former thread that also access the same shared data using the monitor. Using wakeup locality of this invention, the monitor and the shared data protected by monitor tend to stay resident on a processing device cache for longer periods of time and thus the monitor migration rate between processor caches is significantly reduced, translating into better performance of threads that access the shared data.

As an example, within a JVM equipped with an embodiment of the invention, the synchronization subsystem in the JVM can detect when a first process such as a thread executing a first processing device releases access to shared data (e.g., releases ownership of the monitor). As used herein, the terms thread and process are generally interchangeable. When a thread that owns a monitor releases that monitor, the JVM can attempt to identify a successor or second thread that formerly executed on the same processing device as the thread releasing the monitor and that is also awaiting access to the monitor in order to access the shared data associated with the monitor. If the JVM identifies such a thread (e.g., in a blocked thread list of threads awaiting access to the shared data), the JVM can then provide, to the kernel responsible for selecting processes to execute amongst a plurality of processes, the identification of this "second" or successor process as a process that is ready for execution in the multiprocessing computer system. The kernel can use this information when applying in affinity based process selection technique in order to select the identified second process as a next process to execute on that same processing device.

Accordingly, embodiments of the invention are based in part on the observation that when a first thread acquires a monitor, this action is an excellent predictor that another or second thread will also make subsequent accesses to the shared data protected by the monitor (i.e., since the data is shared). As such, by providing identification of a second thread that both formerly executed on the same processing device as a first thread that is releasing the monitor, and that is waiting for ownership or access to the monitor, the kernel can receive the identification of this identified second process as a process that is ready for execution. The JVM of this invention can thus identify a process in a monitor waiting queue that formerly ran on the same processing device as a process releasing the monitor, and it is still awaiting access to the monitor, as a process that the kernel should consider executing next. The synchronization subsystem (e.g., the JVM monitor controller) thus picks and activates (i.e., makes ready) a successor thread that has affinity to the CPU (board or die) of the releasing thread that releases the monitor. Embodiments of the invention refer to this affinity-aware successor selection as "wakeup locality" since according to embodiment of the invention, when the successor thread or process wakes up (i.e., is selected for execution by the CPU) it finds the shared data associated with the monitor to which it is awaiting ownership to be already present in the local cache of that processing device.

Embodiments of the invention significantly enhance performance of the successor thread due to the fact that the shared data on the successor thread is present, at least in part, within the cache of the processing device upon which the successor thread is again executed. This avoids a requirement to completely repopulate the cache with data and thread state information, and/or avoids having to copy cached thread state information from the cache associated with another processor that the thread formerly executed upon that is different than processor that the thread is currently scheduled to execute upon.

More specifically, embodiments of the invention operate within a multiprocessing computer system having a plurality of processing devices and provide mechanisms and techniques for identifying processes to be executed. One method embodiment comprises detecting when a first process (e.g., Java thread) executing on a first processing device releases access to shared data (e.g., releases a monitor). In response to the first process releasing access to the shared data, this embodiment attempts to identify a second process that both formerly executed on the first processing device and that is awaiting access to the shared data. If such a blocked process exists, for example, in a monitor wait queue (e.g., blocked process list), this embodiment of the invention provides, to a kernel responsible for selecting processes to execute amongst the plurality of processing devices, an identification of the second process as a process that is ready for execution in the multiprocessing computer system. In the kernel responsible for selecting processes to execute amongst the plurality of processing devices, the kernel receives the identification of the second process as a process that is ready for execution in the multiprocessing computer system and applies an affinity-based process selection technique to select the second process as a next process to execute on the first processing device. Thereafter, the kernel executes the second process on the first processing device in the multiprocessing computer system.

The first processing device maintains at least a portion of the shared data accessed and released by the first process in a cache associated with the first processing device. One embodiment of the invention executes the second process to access the portion of the shared data maintained in the cache associated with the first processing device, such that the first processing device does not have to access the shared data from a main memory associated with the multiprocessing computer system. Accordingly, embodiments of the invention conserve processing resources by providing suggestions of a thread to execute using an affinity-based successor thread selection algorithm so that the successor thread will experience minimal cache misses during execution.

In a further embodiment, the processing operations of detecting when a first process executing on a first processing device releases access to shared data, attempting to identify a second process, and providing, to a kernel responsible for selecting processes to execute amongst the plurality of processing devices, an identification of the second process, are performed by a synchronization subsystem that operates independently of the kernel to control access to the share data. The synchronization subsystem may be, for example, provided within a Java Virtual Machine or other type of execution environment or may be provided within a kernel of an operating system.

In a another embodiment, attempting to identify a second process that formerly executed on the first processing device and that is awaiting to access shared data comprises reviewing execution state associated with respective blocked processes awaiting access to the shared data. If the execution state of a blocked process indicates that the blocked process formerly executed on the first processing device, then this embodiment of the invention identify that blocked process as the second process (i.e., identify this process to the kernel).

In another embodiment, if multiple blocked processes include associated execution histories that indicate each formerly executed on the first processing device, this operation of identifying that blocked process as the second process in this embodiment comprises, identifying, as the second process that is ready for execution in the multiprocessing computer system, a blocked process that is awaiting access to the shared data and that executed least recently as compared to other blocked processes awaiting access to the shared data. Accordingly, if multiple processes are awaiting access to the shared data and each formerly ran on the processing device of a thread that releases access to the shared data, this embodiment can choose between all of the eligible successor threads by selecting the one executed least recently.

In yet another embodiment, if multiple blocked processes include associated execution histories that indicate each formerly executed on the first processing device, identifying that blocked process as the second process comprises identifying, as the second process that is ready for execution in the multiprocessing computer system, a blocked process that is awaiting access to the shared data and that executed most recently as compared to other blocked processes awaiting access to the shared data. As such, embodiments of the invention are able to select or choose from a list of blocked processes that are all awaiting access to the shared data and that all formerly executed on the processing device from which the first process is executing and releases access the shared data based on various criteria such as which process executed least recently or most recently. Certain reasons for this will be explained in the detailed description of this invention.

In another embodiment, if no blocked process has an associated execution state that indicates former execution on the first processing device, embodiments of the invention can perform an alternate blocked process selection technique to identify a second process as a process that is ready for execution in the multiprocessing computer system. In one embodiment, performing an alternate blocked process selection technique to identify the second process as a process that is ready for execution in the multiprocessing computer system comprises identifying, as the second process that is ready for execution in the multiprocessing computer system, a blocked process that is awaiting access to the shared data and that executed least recently as compared to other blocked processes awaiting access to the shared data, even though the selected process did not execute on the same processing device as the process releasing access to the shared data. Since the "oldest" non-local (i.e., oldest remote) process is chosen, chances are less likely that there is remaining cached shared data state information in a cache of a processing device upon which the "oldest" process formerly executed (i.e., since it is the oldest, chances are likely that its cached state has been overwritten). This refinement reduces cache-to-cache traffic over the interconnect.

In another embodiment, identifying, as the second process that is ready for execution in the multiprocessing computer system, a blocked process that is awaiting access to the shared data and that executed least recently as compared to other blocked processes awaiting access to the shared data comprises applying a forcible migration technique to the identified blocked process that has an execution state indicating that the blocked process executed most recently on a processing device other than the first processing device. A forceable migration technique causes the identified blocked process to migrate to the first processing device when executed by the kernel, and thus this process is identified to the kernel as the second process for execution on the first processing device. In this manner, processes that are blocked and that formerly ran on other processing devices and that are now blocked awaiting access shared data can be signaled so that the kernel (or other migration manager) forcibly migrates one of these processes to the current processing device from which a thread or other process releases access to the shared data.

In a further embodiment, performing an alternate blocked process selection technique to identify the second process as a process that is ready for execution in the multiprocessing computer system comprises applying a forcible migration technique to at least one blocked process that has an execution state indicating that the blocked process executed most recently on a processing device other than the first processing device and that is awaiting access to the shared data to cause the at least one blocked process to migrate to the first processing device when executed by the kernel and to be identified to the kernel as the second process for execution on the first processing device. In this manner, if no process formerly executed on the processing device from which the first process releases access the shared data, embodiments of the invention can select and forcibly migrated another process that most recently formerly executed on different processing device but that is also awaiting access the shared data so that this forcibly migrated process will now be executed on the processing device having cache memory containing cache shared data information thus causing faster execution of that migrated process.

For embodiments that use forcible migration, such embodiments can include operations within the kernel responsible for selecting processes to execute amongst the plurality of processing devices in order to detect that the forcible migration technique has been applied to the blocked process that has an execution state indicating that the blocked process executed most recently on a processing device other than the first processing device and that is awaiting access to the share data and in response. Such embodiments cause the kernel to migrate the blocked process for execution on the first processing device and further cause the kernel to apply a non-affinity-based process selection technique to select that blocked process as a next process to execute on the first processing device.

In another embodiment, there are at least two processing devices that share a common cache with each other. In one configuration, the processing devices that share a common cache with each other comprise different core processors on a common processing die. In such embodiments, when the synchronization scheduler attempts to identify a second process that formerly executed on the first processing device and that is awaiting access to the shared data, the synchronization scheduler cannot identify a second process that formerly executed on the first processing device. In such cases the synchronization scheduler attempts to identify the second process as a process that formerly executed at least one process on the processors that share a common cache, and that is awaiting access to the shared data.

Other embodiments detect an execution behavior pattern for processes that access shared data. Generally, the synchronization subsystem configured according to such embodiments of the invention uses statistical metrics to select either normal successor thread or wake-up locality as explained above on a per monitor basis for access to specific instances of shared data depending upon execution behavior of threads using the monitor. Such embodiments can determine if the execution behavior pattern statistically meets a threshold associated with patterns of access to the shared data, and if the execution behavior pattern statistically meets the threshold associated with patterns of access to the shared data, the synchronization subsystem responsible for controlling access to the shared data to performs the operations of detecting when a first process executing on a first processing device releases access to shared data and in response to the first process releasing access to the shared data, attempting to identify a second process that formerly executed on the first processing device and that is awaiting access to the shared data, and providing, to a kernel responsible for selecting processes to execute amongst the plurality of processing devices, an identification of the second process as a process that is ready for execution in the multiprocessing computer system.

Alternatively, if the execution behavior pattern statistically does not meet the threshold associated with patterns of access to the share data, this embodiment of the invention causes the kernel to perform a normal successor selection process for selection of processes to succeed each other during execution.

In one such embodiment, detecting an execution behavior pattern for processes that access the shared data and determining if the execution behavior pattern statistically meets a threshold are performed periodically such that the multiprocessing computer system selects processes to succeed execution of other processes according to either (or both) the normal successor selection process performed by the kernel (e.g., without assistance from the synchronization scheduler) or using an affinity-based wakeup locality successor selection process performed by a synchronization subsystem that controls access to the share data.

In a related embodiment, detecting an execution behavior pattern for processes that access the shared data comprises calculating an amount of blocked acquire operations for access to the shared data that have occurred over a period of time. The blocked acquire operations are performed by processes that attempt access to the shared data but that result in the process being blocked for access to the shared data by the synchronization scheduler. Thus the amount (e.g., a percentage or rate) of blocked acquire operations indicates how much contention there is between processes for access to the shared data. In such an embodiment, the synchronization scheduler determines if the execution behavior pattern statistically meets a threshold associated with patterns of access to the shared data by determining if the amount of blocked acquire operations meets the threshold.

In another embodiment, detecting an execution behavior pattern for processes that access the shared data comprises calculating an average hold time for accesses to the shared data that have occurred over a period of time performed by processes that access the shared data. To determine if the execution behavior pattern statistically meets a threshold associated with patterns of access to the shared data, a synchronization scheduler configured according to this embodiment can determine if the average hold time for accesses to the shared data meets a threshold.

Other embodiments of the invention include a multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, and computer program products and/or software applications such as operating system's and execution environments such as the Java Virtual Machine manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
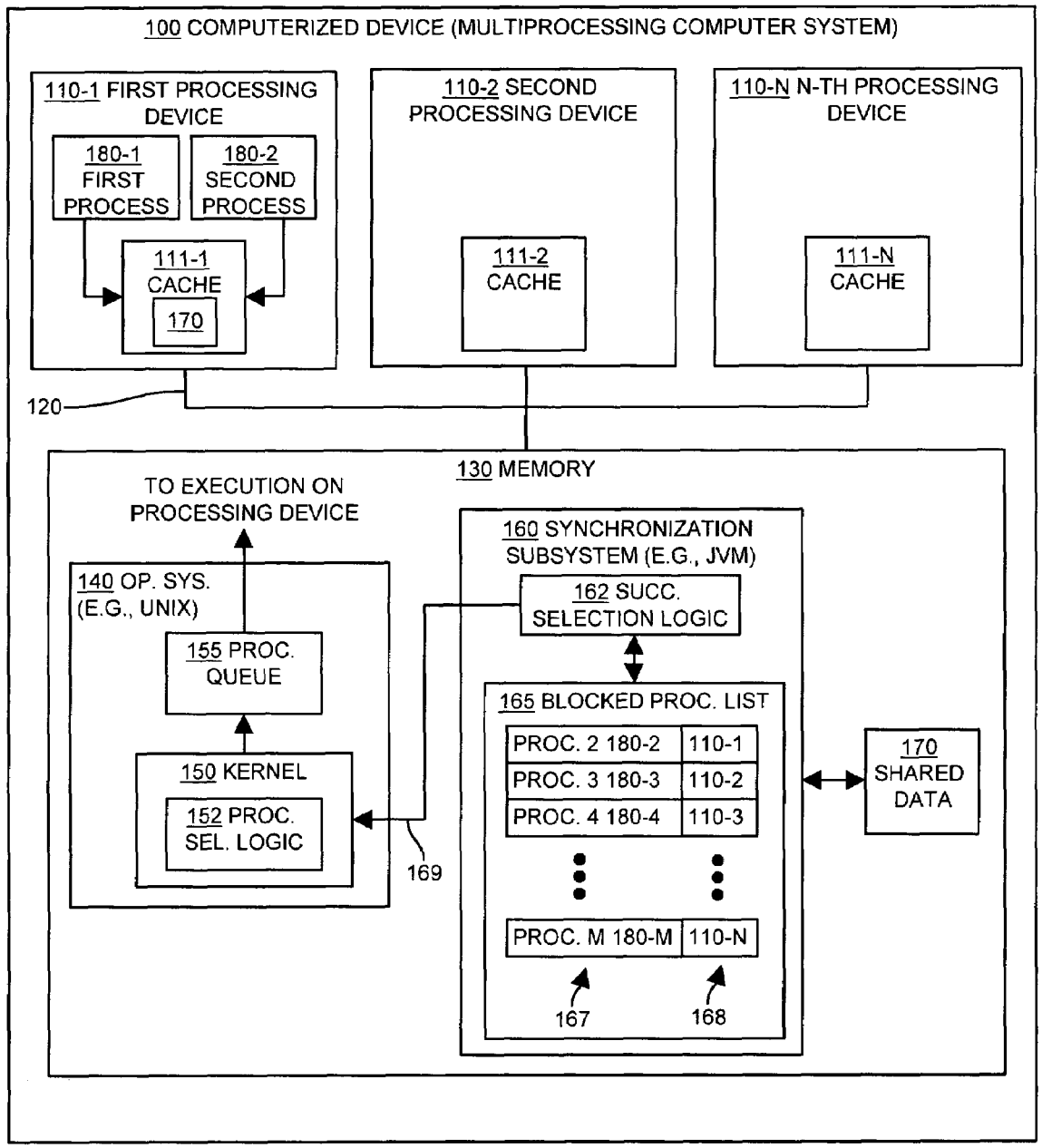
FIG. 1 illustrates an example configuration of a computerized device such as a multiprocessing computer system configured in accordance with one embodiment of the invention.

Embodiments of the invention provide mechanisms and techniques that provide an affinity-based wakeup locality successor selection process capable of biasing a kernel successor selection mechanism to preferentially select a second process that executed on the same processing device as a first process that is releasing access to shared data (e.g., releasing a monitor), as detected by a synchronization subsystem used for successor selection. As an example, within a Java Virtual Machine (JVM) equipped with an embodiment of the invention, the JVM can detect when a first process such as a thread executing on a first processing device releases access to shared data (e.g., releases ownership of a monitor). (Note that the terms "process" and "thread" are used interchangeably in the description of this invention.) When a thread that owns a monitor releases that monitor (i.e., release access to shared data), the JVM can attempt to identify a successor process (i.e., a second thread or process) that formerly executed on the same processing device as the thread releasing the monitor, and that is also awaiting access to the monitor in order to gain access of the shared data. The JVM can then provide, to the kernel responsible for selecting processes to execute amongst a plurality of processes, the identification of the identified second or successor thread or process as a process that is ready for execution in the multiprocessing computer system. The kernel can use this information when applying an affinity-based process selection technique in order to select the second process as a next process to execute on that processing device. This can improve performance of execution of that second process since the cache of the processing device will already be populated with state information related to the shared data for which the second process is awaiting access.

Accordingly, embodiments of the invention are based in part on the observation that when a first thread acquires access to shared data (e.g., acquires a monitor), this is a strong predictor that another or second thread will make subsequent accesses to the shared data protected by the monitor. As such, by providing identification of a second thread that both formerly executed on the same processing device as a first thread that is releasing the monitor, and that is waiting for ownership or access to the monitor, the kernel can receive the identification of the second process as a process that is ready for execution. The JVM can thus identify a process in the monitor or blocked process waiting queue that formerly ran in the same processing device as a process releasing the monitor, and it is still awaiting access to the monitor, as a process that the kernel should consider executing next. The synchronization subsystem (e.g., the JVM monitor controller) thus picks and activates (i.e., makes ready) a successor thread that has affinity to the CPU (board or die) of the releasing thread that releases the monitor. Embodiments of the invention refer to this affinity-aware successor selection as "wakeup locality" since according to embodiment of the invention, when the successor thread or process wakes up (i.e., is selected for execution by the CPU) it finds the shared data associated with the monitor to which it is awaiting ownership to be already present in the local cache of that processing device.

Embodiments of the invention significantly enhance performance of the successor thread due to the fact that the shared data used by the successor thread is present, either in whole or at least in part, within the cache of the processing device upon which the successor thread is again executed. This avoids a requirement to completely repopulate the cache with shared data and thread state information from scratch, and avoids having to copy or migrate cached thread state information from the cache associated with another processing device that the thread formerly executed upon that is different than processor that the thread is currently scheduled to execute upon.

FIG. 1A illustrates a computerized device 100 such as a multiprocessing computer system configured according to one example embodiment of the invention. The computerized device 100 includes a plurality of processing devices 110-1 through 110-N that each include a respective cache memory system 111-1 through 111-N. An interconnection mechanism 120, which may be a data bus or other circuitry, couples each processing device 110 to a memory 130. In this example, the memory 130 is encoded with software programs and data structures that include, in this example, an operating system 140 containing a kernel 150, a synchronization subsystem 160 and one or more portions of shared data 170. The operating system 140 may be any type of multiprocessing operating system such as any variant of UNIX, Windows (Windows is a registered trademark of Microsoft Corp. of Redmond, Wash., USA) or other operating system. The kernel includes processor selection logic 152 that operates as explained herein to select individual processes 180 from a queue of ready processes 155 for scheduled execution on the processing devices 110.

The synchronization subsystem 160 includes successor selection logic 162 that operates as explained herein to identify successor processes 180 from within a blocked process list 165. The blocked process list 165 is a process or thread queue that the synchronization subsystem 160 uses to track the identities 167 of blocked processes 180 (within the list 165) that are each awaiting access to the shared data 170. For each entry in the blocked process list 165, process identities 180 are included along with an identity 168 of a former processing device that indicates which processing device 110 the process identified in that entry formerly executed upon, prior to becoming blocked for access to the shared data 170. In other words, the blocked process list 165 indicates those processes or threads that are awaiting access to the shared data 170 and further indicates the former processing device identification 168 of the various processing devices 110 upon which those blocked processes 167 executed on prior to becoming blocked for access to the shared data 170.

Generally, according to operations of embodiments of invention, the synchronization subsystem 160 can track execution of processes 180 within the processing devices 110 that access the shared data 170 (e.g., via management of monitors). When an executing process 180 (e.g., 180-1) within one of the processing devices 110 releases access to shared data 170 (e.g., releases access to a monitor associated with the blocked process list of 165 for particular portion of shared data 170, such as a page of shared memory), the synchronization subsystem 160 activates successor selection logic 162 to identify one of the processes 167 as a second process 180-2 within the blocked process list 165. The selected second process 180-2 is awaiting access to the shared data 170 and has an associated former processing device identification 168 that corresponds with (i.e., is equivalent to) the processing device identity 110-1 upon which the executing first process 180-1 released the access to the shared data 170.

As an example illustrated in FIG. 1A, if a first process (process 1) 180-1 executing on the first processing device 110-1 owns access rights (e.g., a monitor) to the shared data 170, the synchronization subsystem 160 will be aware of this fact. If, during execution of the first process 180-1, the first process 180-1 releases access to the shared data 170, the successor selection logic 162 will attempt to identify a second process, within the blocked process list 165 that corresponds to the released shared data 170 (i.e., that contains a list of processes awaiting access to this particular portion of shared data 170), that formerly executed also on the first processing device 110-1. In this example, a second process 180-2 matches this description since the second process identity 180-2 is contained within the blocked process list 165 for this particular portion of shared data 170 and the former processing device identity 168 associated with the blocked process list entry for the second process 180-2 indicates that this second process 180-2 formerly executed on the first processing device 110-1. As such, the successor selection logic 162 can provide an identification 169 of this second process 180-2 to the processor selection logic 152 within the kernel 150 so that the kernel can apply an affinity-based selection technique in order to select the second process 180-2 for execution on the first processing device 110-1, such as when the time slice of the first process 180-1 is complete, or if the first process 180-1 is preempted for some reason, or if the first process 180-1 voluntarily blocks itself (e.g., on a read or for synchronization purposes).

Using the aforementioned processing technique, embodiments of invention cause the processor selection logic 152 within the kernel 150 to be provided with the identity of a preferred second process to execute after preemption of a first process executing on the processing device based upon the fact that the suggested second process formerly also executed on the same processing device as the preempted first process and is also awaiting access to the shared data 170 for which the first process released access. In this manner, chances are significantly higher that the cache memory 111 of the particular processing device contains portions of the shared data 170 and the execution of the second process will be enhanced since the cache 111 is already populated with memory for which the second process is awaiting access.

FIG. 1B illustrates an alternative arrangement of a multiprocessing computerized device 100 configured in accordance with one example embodiment of the invention. In the computerized device in FIG. 1B, instead of each processing device 110 having its own separate respective cache 111 (as in FIG. 1A), processing devices 110-Z1 through 110-ZN, known as processing "cores", share a single shared cache memory 111-Z and reside on a single processing "die" 113.

Figure 2:
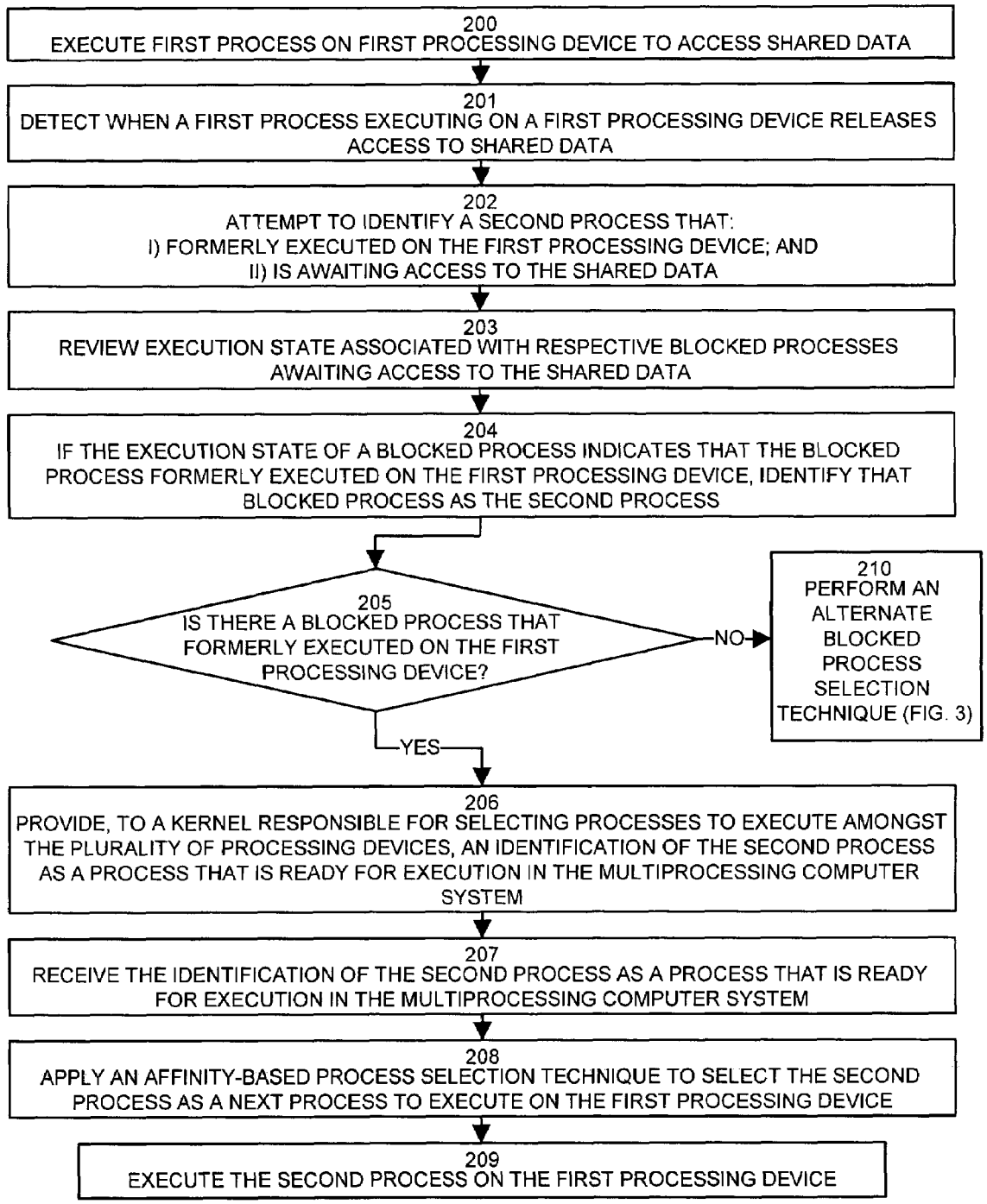
FIG. 2 is a flowchart of processing steps that show processing performed according to embodiment of the invention to provide an provide an affinity-based wakeup locality successor selection process in accordance with embodiments of the invention.

FIG. 2 is a flowchart of processing operations performed according to embodiments of invention to identify processes to be executed in accordance with the techniques explained herein. During the discussion of processing steps shown in the flowchart in FIG. 2, reference will be made to the example configuration of the multiprocessing computer system 100 discussed above and illustrated in FIG. 1A.

In step 200, the kernel 150 of the operating system 140 executes the first process 180-1 on a first processing device 110-1 which performs access to the shared data 170. In other words, in step 200 the first process 180-1 executes on the first processing device 110-1 and owns or has possession of a monitor that allows that process exclusive access to the shared data 170.

Steps 201 through 203 explained next are performed by the synchronization subsystem that operates independently, in this example, of kernel 150, to control access to the shared data 170. As an example, the synchronization subsystem 160 may be incorporated within an execution environment such as a JVM and the processes 180 for which controlled access to the shared data 170 is performed may be Java threads.

In step 201, the synchronization subsystem 160 detects when the first process 180-1 executing on the first processing device 110-1 releases access to the shared data 170. If the synchronization subsystem 160 is part of a JVM, the synchronization subsystem 160 may detect when a Java threads releases a monitor for control or synchronized access to the shared data 170.

Next, in step 202, in response to the first process 180-1 releasing access to the shared data 170, successor selection logic 162 operating within the synchronization subsystem 160 attempts to identify a second process that formerly executed on the first processing device 110-1 and that is awaiting access to the shared data 170.

In sub-step 203, to identify the second process that formerly executed in the first processing device and that is awaiting access to shared data, the successor selection logic 162 can review execution state (e.g., the blocked process list 165) associated with respective blocked processes awaiting access to the shared data 170.

In sub-step 204, if the execution state (e.g., information in the blocked process list 165) of a blocked process indicates that the blocked process formerly executed on the first processing device 110-1, the successor selection logic 162 identifies that blocked process as a second process within step 202.

As illustrated in FIG. 1A, in step 202 and associated sub-steps 203 and 204, the successor selection logic 162 can consult the blocked process list or queue 165 that identifies those processes 180 (i.e., in the process identification column 167) awaiting access to the shared data 170. The successor selection logic 162 can scan this list for former processing device identification(s) 168 (one or more) that correspond to the identity of the first processing device 110-1 upon which the first process 180-1 just released access to the shared data 170. In the illustrated example, the entry for the second process 180-2 indicates that this process formerly executed on the first processing device 110-1 (i.e., the same processing device upon which the first process 180-1 was executing the released access to the shared data 170).

In one embodiment of step 204, if multiple blocked processes include associated execution histories that indicate each formerly executed on the first processing device 110-1 (i.e., there are many blocked processes to choose from that all at one point formerly executed on the first processing device), then in step 204, the synchronization scheduler 160 can identify, as the second process 180-2 that is ready for execution in the multiprocessing computer system 100, a blocked process that is awaiting access to the shared data and that executed least recently as compared to other blocked processes awaiting access to the shared data.

In an alternative embodiment of step 204, if multiple blocked processes include associated execution histories that indicate each formerly executed on the first processing device, then the synchronization scheduler in step 204 can identify, as the second process that is ready for execution in the multiprocessing computer system, a blocked process that is awaiting access to the shared data and that executed most recently as compared to other blocked processes awaiting access to the shared data.

Next, in step 205, the successor selection logic 162 determines if there is a blocked process that has an associated execution state (i.e., in entry within the blocked process list 165) that indicates former execution on the first processing device 110-1. If such a blocked process exists, processing proceeds to step 206. Alternatively, if no such process exists, processing proceeds to step 210. In other words, processing proceeds to step 210 if no processes identified in the blocked process list 165 indicate former execution on the processing device 110-1 for which the first process 180-1 releases access to shared data 170.

In step 206, upon identifying the second process 180-2 (i.e., a blocked process did exist that formerly executed on the processing device 110-1 for which the first process 180-1 s executing and released access to the shared data 170), the successor selection logic 162 within the synchronization subsystem 160 provides, to the kernel 150 responsible for selecting processes 180 to execute amongst the plurality of processing device is 110, an identification 169 of the second process 180-2 as a process that is ready for execution in the multiprocessing computer system 100.

Steps 207 through 209 are performed by the kernel 150 that includes process selection logic 152 that can apply can an affinity-based process selection technique in order to schedule processes for execution upon the processing device is 110.

In step 207, the process selection logic 152 within the kernel 150 receives the identification 169 of the second process 180-2 as a process that is ready for execution within the multiprocessing computer system 100.

Next, in step 208, the process selection logic 152 applies an affinity-based process selection technique to select the second process 180-2 as the next process to execute on the first processing device 110-1.

Thereafter, in step 209 the kernel 150 executes the second process 180-2 on the first processing device 110-1. The first processing device 110-1 maintains at least a portion of the shared data 170 accessed and released by the first process 180-1 in the cache 111-1 associated with the first processing device 110-1. Accordingly, in step 209 the kernel executes the second process 180-2 (that was awaiting access to the shared data 170) to access portion(s) of the shared data 170 that are still maintained in the cache 111-1 associated with the first processing device 110-1, such that the first processing device 110-1 does not have to access all of the shared data 170 from the main memory 130 associated with the multiprocessing computer system 100. In this manner, execution performance of the second process 180-2 is significantly improved.

Returning attention back to step 205, if no blocked process has an associated execution state within the blocked process queue 165 that indicates former execution upon the first processing device 110-1, processing proceeds to step 210.

In step 210, the successor selection logic 162 operating in conjunction with the kernel 150 performs an alternate blocked process selection technique to identify an appropriate second process that is ready for execution in the multiprocessing computer system 100 upon the first processing device 110-1. Specific details of various alternative blocked process selection techniques configured in accordance with embodiments of the invention will be explained shortly with respect to the flowchart of processing steps illustrated in FIG. 3. Generally however, an alternate blocked process selection techniques is used by embodiments of the invention when there is no process identified within the blocked process list 165 that is awaiting access to shared data 170 and that executed on the first processing device 110-1. As an example, it may be the case perhaps that several processes are awaiting access to the shared data 170 as identified within the blocked process list 165 but that none of them formerly executed on the first processing device 110-1. In such instances, embodiments of the invention can perform the processing steps illustrated in FIG. 3 to provide the alternate blocked process selection technique.

Figure 3:
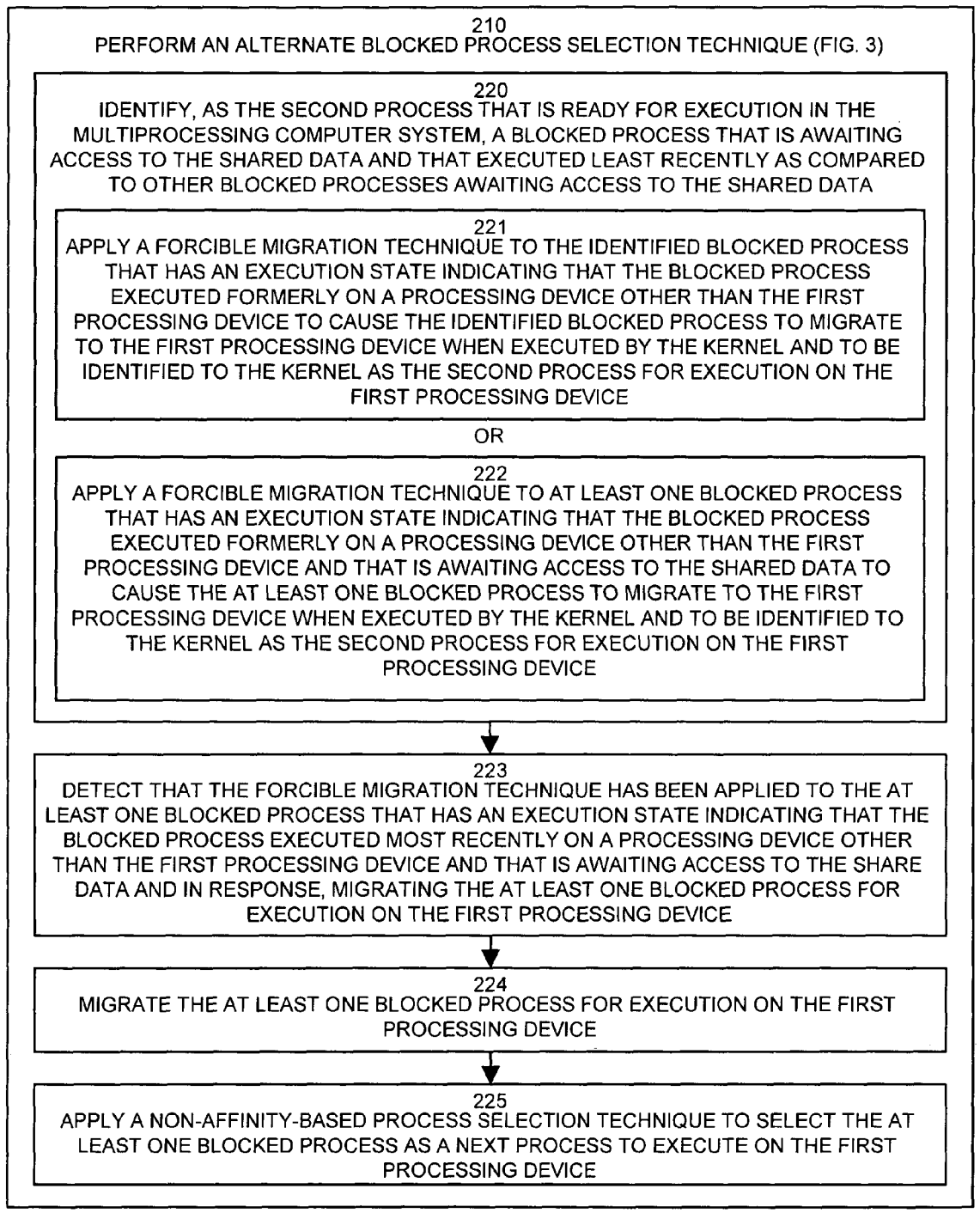
FIG. 3 is a flowchart of processing performed according to embodiments of the invention to provide an alternate blocked process selection technique.

FIG. 3 is a flow chart of processing steps performed according to one embodiment of the invention to perform an alternate blocked process selection technique to identify which process will execute as the second process following execution of the first process on the first processing device 110-1 that released access to shared data. The processing steps illustrated in FIG. 3 apply when the previous processing of the successor selection logic 162 in the synchronization subsystem 120 can detect a process entry in the blocked process list 165 that identifies a blocked process awaiting access to the shared data 170 and that executed on the first processing device 110-1. Since there is no process awaiting access to the shared data 170 that formerly executed on the first processing device, embodiments of the invention can provide the processing steps illustrated in FIG. 3 in order to select another blocked process from the blocked process list 165 for execution as the second process 180-2 to follow immediately after execution of the first process 180-1 in the first processing device 110-1.

As discussed above, in step 210 (shown again in FIG. 3), the successor selection logic 162 operating in conjunction with the kernel 150 performs an alternate blocked process selection technique to identify an appropriate second process that is ready for execution in the multiprocessing computer system 100 upon the first processing device 110-1.

Steps 220 (including sub-step 221) and 222 identify two alternative processing mechanisms for selection of a second process for execution after the first process 180-1.

In step 220, the successor selection logic 162 within the synchronization subsystem 160 identifies, as the second process that is ready for execution in the multiprocessing computer system 100, a blocked process that is awaiting access to the shared data (i.e., in the block process list 165) and that executed least recently as compared to other blocked processes awaiting access to the shared data.

Within this operation, in sub-step 221 the successor selection logic 162 applies a forcible migration technique to the identified blocked process that has an execution state (e.g., in entry in the blocked process list 165) indicating that the blocked process executed least recently on a processing device 110-2 through 110-N other than the first processing device 110-1. The forcible migration technique causes the identified blocked process to migrate to the first processing device 110-1 when executed by the kernel 150, and to be identified to the kernel 150 as the second process 180-2 for execution on the first processing device 110-1 following execution of the first process 180-1. In this manner, step 220 (and sub-step 221) cause the synchronization subsystem 160 to select a second process 180-2 from the list of blocked processes 165 that least recently executed as compared to other processes in the blocked process list 165 that are each awaiting access to the shared data 170.

By choosing a process that executed least recently as compared to other processes, the chances of affinity existing with respect to cached data that that process has accessed on another processing device (i.e., during its former execution)

is different in the first processing device 110-1 is fairly small. That is, by choosing a process that executed least recently, chances are likely that there will be no cached shared data existing within a cache that is associated with another processing device which would have to be migrated to the cache of the first processing device 110-1 when the least recently executed process is selected as the second process to follow execution of the first process that releases access to the shared data.

Step 222 identifies an alternative configuration, in which the successor selection logic 162 applies a forcible migration technique to at least one blocked process that has an execution state indicating that the blocked process executed most recently on a processing device 110-2 through 110-N other than the first processing device 110-1, and that is awaiting access to the shared data 170. The forcible migration technique causes the blocked process to migrate to the first processing device 110-1 when executed by the kernel and successor selection logic 162 identifies this process to the kernel as the second process for execution on the first processing device 110-1.

After processing either of steps 220 and 221, or 222, processing proceeds to step 223 and operates in the kernel 150 responsible for selecting processes 180 to execute amongst the plurality of processing devices 110.

In step 223, the kernel 150, using the process selection logic 152, detects that the forcible migration technique has been applied to the blocked process that has an execution state indicating that the blocked process executed on a processing device other than the first processing device and that is awaiting access to the shared data.

In response, in step 224 the kernel 150 migrates the blocked process identified by the synchronization subsystem 160 for execution on the first processing device 110-1. Those skilled in the art are familiar with process migration techniques and any of such techniques can be utilized by embodiments of this invention.

Thereafter, in step 225 the kernel 150 applies a non-affinity-based process selection technique to select the blocked process as a next or second process 180-2 to execute on the first processing device 110-1.

The following example scenario illustrates the benefits of "wakeup locality" as provided by embodiments of the invention. Assume for this example that, within a Java Virtual Machine, a first Java process (e.g., a thread) 180-1 executing on a processing device 110-1 acquires a monitor for access to a set of shared data 170. After the accesses, much of the shared data 170 now resides in the cache 111-1. When the thread 180-1 releases the monitor for access to the shared data 170, the synchronization subsystem 160 maintains the blocked process (i.e., thread) list 165 indicating a list of blocked processes that includes a process 180-2 (which ran recently on processor 110-1), a process 180-3 (which ran recently on processing device 110-2) and a process 180-N (which ran along time ago on processing device 110-N). According to the processing of embodiments of the invention as discussed above, the synchronization subsystem 160 preferentially identifies process 180-2 as the second process because process 180-2 shares processing device affinity with process 180-1. The synchronization subsystem thus indicates, the kernel 150, that the process 180-2 is the second process that can be activated (i.e., makes it ready for execution).

The kernel scheduler (e.g., process selection logic 152) subsequently elects to run the process 180-2 and since the process 180-2 ran recently on the processing device 110-1, the kernel scheduler tends to place execution of the second process 180-2 on the processing device 110-1 (i.e., due to affinity scheduling performed by the kernel). The process 180-2 thus resumes execution on processing device 110-1 and re-contends for the monitor to obtain access to the shared data. Assuming for this example that the process 180-2 successfully acquires the monitor to gain access to (e.g., read from or write to) the shared data 170, the process 180-2 can then access the shared data 170, protected by the monitor. Since the shared data 170 is already present in the cache 111-1 (at least some of it will be) of the processing device 110-1, the memory accesses performed by the second process 180-2 are more efficient and require fewer cycles-per-instruction (CPI). This translates directly into improved throughput. Using the wakeup locality techniques of this invention, experiments have demonstrated large speedups for highly contended multi-threaded programs running on Sun Microsystems, Inc.'s multiprocessor systems and on Intel IA32 Hyper-Threaded Symmetric Multi-Tasking (SMT) processor-based systems.

Figure 4:
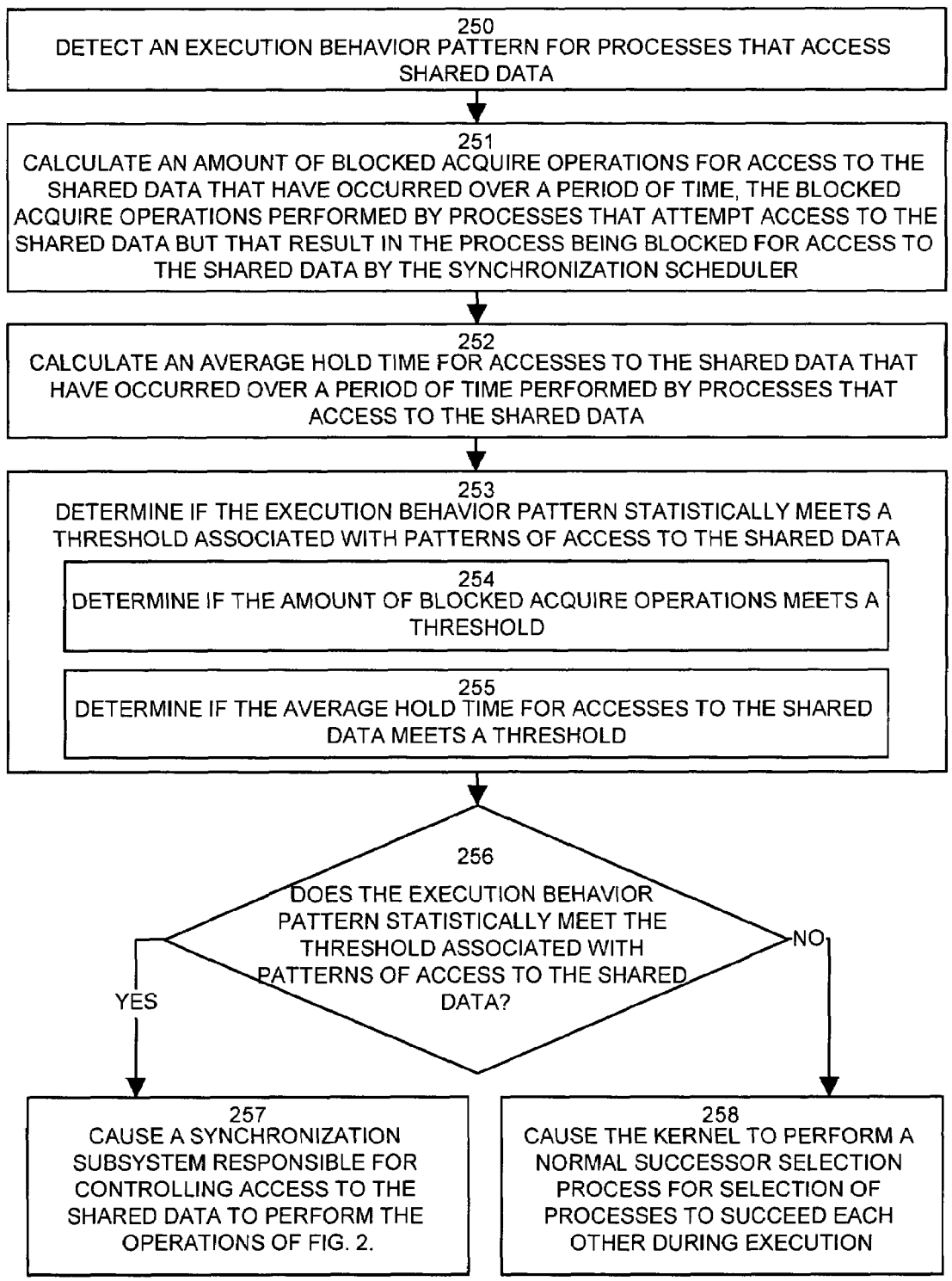
FIG. 4 is a flowchart of processing steps that utilize execution behavior patterns regarding access to share data in order to select successor processes for execution by a kernel in accordance with example embodiments of the invention.

FIG. 4 is a flow chart of processing steps that show processing operations or steps performed according to alternative embodiments of the invention that provide enhancements to the aforementioned embodiments. In particular, embodiments discussed below with respect to the processing steps in FIG. 4 utilize a concept of execution behavior patterns in order to determine whether or not to apply wakeup locality as discussed above in conjunction with the affinity-based process scheduling mechanisms. Aspects of embodiments shown by the processing in FIG. 4 are based in part on the observation that for certain modes of monitor usage (i.e., for certain situations of processes execution when performing access to shared data), wakeup locality provides reduced benefit, and in certain situations in fact can degrade performance. This is due in part to the fact that wakeup locality as explained above when performed in the synchronization subsystem 160 incurs a slight processing expense in scanning the list 165 of blocked threads and picking a thread with affinity to the thread or process that just released access to the shared data 170. If that extra processing cost outweighs the benefit of not having to transfer or migrate cache memory for the shared data between processing devices 110, then wakeup locality will not be profitable (i.e., will not increase performance).

As such, embodiments of the invention can determine execution behavior patterns that calculate and utilize metrics that allow the synchronization subsystem 160 to select either normal successor (i.e., do not perform the processing of FIG. 2) or wakeup locality on a per-shared data portion basis, depending on the recent behavior of processes that access that shared data. In particular, as to be explained shortly with respect to the processing steps in FIG. 4, one metric that embodiments of the invention can use in determining execution behavior patterns of access the shared data is the "contention level" of different processes when accessing particular portion of shared data (e.g., a portion of shared data associated with a monitor in a JVM).

Generally, the contention level for shared data indicates a percentage of recent acquire operations for access to that shared data that required blocking due to another process already maintaining ownership of that shared data. If this contention level percentage is low then the shared data is lightly contended or un-contended. In that case the monitor migration rate will be low so wakeup locality may provide little or no benefit. As such, embodiments of the invention are able to disable wakeup locality for the monitor while its contention level is low. On the other hand if a monitor is heavily contended then data protected by the monitor is more likely to migrate between processing devices. In this case, embodiments of the invention can apply wakeup locality to decrease the data migration rate and improve the performance of the application.

Another statistic utilized by embodiments of the invention is shared data average access or "hold" time. In these embodiments, the synchronization subsystem 160 tracks the recent average hold times for accesses to the shared data. The hold time is a time period between acquisition and release of the shared data. Prior hold times of threads correlate strongly with, and can be used to predict future hold times of successor threads. If the hold time for a portion of shared data is relatively short, then wakeup locality is not likely to be profitable in benefiting performance. In some situations, the latency or processing required to scan the blocked process list 165 might exceed the length of execution time of a critical code section that access the shared data, as protected by a monitor in a JVM. In addition, a short hold time may put a limit on the amount of shared data that could be touched (i.e., accessed) by the owning thread while holding the monitor and thus less cached shared data would actually exist in the cache 111 of a processing device 110. This, in turn, may also limit the value of wakeup locality as compared to the processing costs of performing blocked process list scanning, etc. Accordingly, embodiments of the invention can calculate and use metrics such as average shared data hold time and/or contention level to significantly reduce any overhead penalties that may be associated with wakeup locality while preserving the benefit in the operating regimes or situations where it is profitable.

More specifically, directing attention to FIG. 4, in step 250 the synchronization subsystem 160 detects an execution behavior pattern for processes that access shared data.

In step 251 the synchronization subsystem 160 calculates an amount of blocked acquire operations for access to the shared data that have occurred over a period of time. The blocked acquire operations are performed by processes 180 that attempt access to the shared data 170 but that result in the process 180 being blocked for access to the shared data 170 by the synchronization scheduler 160.

Alternatively and/or in conjunction with step 251, in step 252 the synchronization subsystem 160 calculates an average hold time for accesses to the shared data 170 that have occurred over a period of time performed by processes 180 that access the shared data 170. The synchronization subsystem 160 can use counters and timers to track and compute an average of how long each process 180 holds the shared data 170.

In step 253 the synchronization subsystem 160 determines if the execution behavior pattern statistically meets a threshold associated with patterns of access to the shared data.

In step 254, if contention level (i.e., amount of blocked acquire operations for access to the shared data that have occurred over a period of time) was used in step 251, then the synchronization subsystem 160 determines if the amount of blocked acquire operations meets a threshold such as a contention level threshold. As an example, if there are, on average, five attempts to access to the shared data over a certain time period (such as 10 microseconds), then the contention level for that shared data may be considered high and exceeding the threshold, whereas if there are less than five in the time period, the contention level can be considered below the threshold and wakeup locality would not be performed.

Alternatively, or in conjunction with step 254, if the synchronization subsystem 160 calculates an average hold time for accesses to the shared data 170 (in step 252, then in step 255, the synchronization subsystem 160 determines if the average hold time for accesses to the shared data meets a threshold. As an example, an average hold time of five milliseconds for a process to hold ownership and control of a portion of shared data 170 may be an indication that the average hold time exceeds the threshold.

In step 256, if the execution behavior pattern(s) statistically meets the threshold associated with patterns of access to the shared data, the synchronization subsystem 160 proceed to step 257.

In step 257, the synchronization subsystem 160 responsible for controlling access to the shared data performs the operations of wakeup locality as explained above with respect to FIG. 2 (i.e., performs processing steps 201 through 206).

Alternatively, in step 256 if the execution behavior pattern statistically does not meet the threshold associated with patterns of access to the share data, the synchronization subsystem 160 proceeds to step 258.

In step 258, the synchronization subsystem 160 causes the kernel to perform a normal successor selection process for selection of processes to succeed each other during execution (i.e., does not perform wakeup locality as explained above).

Note that the processing of FIG. 4 can be performed periodically such that the multiprocessing computer system 100 selects processes to succeed execution of other processes according to either the normal successor selection process performed by the kernel 150 or the affinity based wakeup locality successor selection process performed by a synchronization subsystem that controls access to the shared data 170 in conjunction with the kernel 150.

From the aforementioned discussion, it is to be understood that embodiments of the invention implement unique mechanisms and techniques that provide an affinity-based wakeup locality successor selection process that can identify processes to be executed by a kernel. Those skilled in the art will understand that there can be many variations made to the embodiments explained above while still achieving the same objective of those embodiments and the invention in general. As an example, the specific processing steps discussed above can be rearranged in different orders while still achieving the same overall result as provided by embodiments of the invention. As another example, it is also to be understood that the techniques described herein that provide wakeup locality are not limited to Java or operation within a Java Virtual Machine. In alternative configurations, embodiments of the invention are applicable to other execution environments such as, for example, native C code with "pthreads" or POSIX threading libraries and/or to kernel-level synchronization primitives or other types of program execution environments in which processes access shared data and must be scheduled for execution on one or more processing devices.

According to another alternative embodiment of the invention, for "multithreaded" SMT processors such as Intel's Hyper-Threaded processors, the successor selection code may enhance processing performance by preferentially picking a thread or process that ran recently on some other core on the same die (cores on the same die share the L2 cache). This mechanism and technique provides wakeup locality while at the same time maximizing parallelism between the releasing thread and the successor. (The releasing thread can continue to run on its core while the successor can potentially run on the other core). In particular, the plurality of processing devices 180 can include at least two processing devices that share a common cache with each other, such as two cores on the same die. In such cases, embodiments of the invention that attempt to identify a second process that formerly executed on the first processing device and that is awaiting access to the shared data cannot identify a second process that formerly executed on the first processing device. In such cases, such embodiments can attempt to identify the second process as a process that i) formerly executed at least one process of the processors (i.e., processing device cores) that share a common cache (i.e., on the same processing die) and that ii) is awaiting access to the shared data. In such embodiments, the two or more processing device that share a common cache with each other comprise different core processors on a common processing die.

As such, in embodiments in which processing devices are cores on a common die that share a single cache, such embodiments attempt to identify a successor thread to run on the same processing board or die as the releasing thread that activated the successor. To achieve this, embodiments of the invention preferentially pick a successor thread that the kernel scheduler, because of the kernel's affinity policy, is likely to place on the desired CPU (board or die). A conventional synchronization subsystem not equipped with embodiments of the invention selects a successor thread based strictly on queue discipline (i.e., first in first out). Using the invention however, the kernel, using affinity information for the thread, then carefully picks which CPU's dispatch queue to place the thread on. That is, the synchronization subsystem 160 picks which thread to activate and this selection may be in an order other than first in first out (of the blocked process list 165), and the kernel then picks where, as in which CPU processing device 110, and when to run the thread. The synchronization subsystem 160 configured according to embodiments of the invention selects an appropriate successor thread from the list of blocked threads, but the selection criteria takes the kernel's affinity mechanism into account thus significantly decreasing the amount of cache misses when the successor thread executes. Accordingly, embodiments of the invention are not intended to be limiting to the aforementioned discussion, but rather, equivalents to the aforementioned processing steps are intended to be included as embodiments of the invention.

What is claimed is:

1. In a multiprocessing computer system having a plurality of processing devices, a method for identifying processes to be executed, the method comprising:
   detecting when a first process executing on a first processing device releases access to shared data, wherein the first processing device maintains at least a portion of the shared data accessed and released by the first process in a cache associated with the first processing device;
   in response to the first process releasing access to the shared data, attempting to identify a second process that:
   i) formerly executed on the first processing device; and
   ii) is awaiting access to the shared data; and
   providing, to a kernel responsible for selecting processes to execute amongst the plurality of processing devices, an identification of the second process as a process that is ready for execution in the multiprocessing computer system;
   in the kernel responsible for selecting processes to execute amongst the plurality of processing devices:
   receiving the identification of the second process as a process that is ready for execution in the multiprocessing computer system;
   applying an affinity-based process selection technique to select the second process as a next process to execute on the first processing device;
   executing the second process on the first processing device by executing the second process to access the at least a portion of the shared data maintained in the cache associated with the first processing device, such that the first processing device does not have to access that at least a portion of the shared data from a main memory associated with the multiprocessing computer system.

2. The method of claim 1 wherein detecting when a first process executing on a first processing device releases access to shared data, attempting to identify a second process, and providing, to a kernel responsible for selecting processes to execute amongst the plurality of processing devices, an identification of the second process are performed by a synchronization subsystem that operates independently of the kernel to control access to the share data.

3. The method of claim 2 wherein the synchronization subsystem operates in a Java Virtual Machine.

4. The method of claim 1 wherein attempting to identify a second process that formerly executed on the first processing device and that is awaiting to access shared data comprises:
   reviewing execution state associated with respective blocked processes awaiting access to the shared data; and
   if the execution state of a blocked process indicates that the blocked process formerly executed on the first processing device, identifying that blocked process as the second process.

5. The method of claim 4 wherein if multiple blocked processes include associated execution histories that indicate each form executed on the first processing device, identifying that blocked process as the second process comprises:
   identifying, as the second process that is ready for execution in the multiprocessing computer system, a blocked process that is awaiting access to the shared data and that executed least recently as compared to other blocked processes awaiting access to the shared data.

6. The method of claim 4 wherein if multiple blocked processes include associated execution histories that indicate each form executed on the first processing device, identifying that blocked process as the second process comprises:
   identifying, as the second process that is ready for execution in the multiprocessing computer system, a blocked process that is awaiting access to the shared data and that executed most recently as compared to other blocked processes awaiting access to the shared data.

7. The method of claim 4 wherein:
   if no blocked process has an associated execution state that indicates former execution on the first processing device, performing an alternate blocked process selection technique to identify the second process as a process that is ready for execution in the multiprocessing computer system.

8. The method of claim 7 wherein performing an alternate blocked process selection technique to identify the second process as a process that is ready for execution in the multiprocessing computer system comprises:
   identifying, as the second process that is ready for execution in the multiprocessing computer system, a blocked process that is awaiting access to the shared data and that executed least recently as compared to other blocked processes awaiting access to the shared data.

9. The method of claim 8 wherein identifying, as the second process that is ready for execution in the multiprocessing computer system, a blocked process that is awaiting access to the shared data and that executed least recently as compared to other blocked processes awaiting access to the shared data comprises:
   applying a forcible migration technique to the identified blocked process that has an execution state indicating that the blocked process executed formerly on a processing device other than the first processing device to cause the identified blocked process to migrate to the first processing device when executed by the kernel and to be identified to the kernel as the second process for execution on the first processing device.

10. The method of claim 7 wherein performing an alternate blocked process selection technique to identify the second process as a process that is ready for execution in the multiprocessing computer system comprises:
   applying a forcible migration technique to at least one blocked process that has an execution state indicating that the blocked process executed formerly on a processing device other than the first processing device and that is awaiting access to the shared data to cause the at least one blocked process to migrate to the first processing device when executed by the kernel and to be identified to the kernel as the second process for execution on the first processing device.

11. The method of claim 10 comprising:
   in the kernel responsible for selecting processes to execute amongst the plurality of processing devices:
   detecting that the forcible migration technique has been applied to the at least one blocked process that has an execution state indicating that the blocked process executed most recently on a processing device other than the first processing device and that is awaiting access to the share data and in response, migrating the at least one blocked process for execution on the first processing device; and
   applying a non-affinity-based process selection technique to select the at least one blocked process as a next process to execute on the first processing device.

12. The method of claim 1 wherein:
   the plurality of processing devices includes at least two processing devices that share a common cache with each other;
   attempting to identify a second process that formerly executed on the first processing device and that is awaiting access to the shared data cannot identify a second process that formerly executed on the first processing device; and
   wherein the method comprises:
   attempting to identify the second process as a process that:
   i) formerly executed at least one process of the at least two processors that share a common cache; and
   ii) is awaiting access to the shared data.

13. The method of claim 12 wherein the at least two processing device that share a common cache with each other comprises different core processors on a common processing die.

14. The method of claim 1 comprising:
   detecting an execution behavior pattern for processes that access shared data;
   determining if the execution behavior pattern statistically meets a threshold associated with patterns of access to the shared data, and if the execution behavior pattern statistically meets the threshold associated with patterns of access to the shared data, causing a synchronization subsystem responsible for controlling access to the shared data to perform the operations of:
   detecting when a first process executing on a first processing device releases access to shared data;
   in response to the first process releasing access to the shared data, attempting to identify a second process that:
   i) formerly executed on the first processing device; and
   ii) is awaiting access to the shared data; and
   providing, to a kernel responsible for selecting processes to execute amongst the plurality of processing devices, an identification of the second process as a process that is ready for execution in the multiprocessing computer system; and
   if the execution behavior pattern statistically does not meet the threshold associated with patterns of access to the share data, causing the kernel to perform a normal successor selection process for selection of processes to succeed each other during execution.

15. The method of claim 14 wherein detecting an execution behavior pattern for processes that access the shared data and determining if the execution behavior pattern statistically meets a threshold are performed periodically such that the multiprocessing computer system selects processes to succeed execution of other processes according to at least one of:
   the normal successor selection process performed by the kernel;
   the affinity based wakeup locality successor selection process performed by a synchronization subsystem that controls access to the share data.

16. The method of claim 14 wherein detecting an execution behavior pattern for processes that access the shared data comprises:
   calculating an amount of blocked acquire operations for access to the shared data that have occurred over a period of time, the blocked acquire operations performed by processes that attempt access to the shared data but that result in the process being blocked for access to the shared data by the synchronization scheduler; and
   wherein determining if the execution behavior pattern statistically meets a threshold associated with patterns of access to the shared data comprises:
   determining if the amount of blocked acquire operations meets a threshold.

17. The method of claim 14 wherein detecting an execution behavior pattern for processes that access the shared data comprises:
   calculating an average hold time for accesses to the shared data that have occurred over a period of time performed by processes that access to the shared data; and
   wherein determining if the execution behavior pattern statistically meets a threshold associated with patterns of access to the shared data comprises:
   determining if the average hold time for accesses to the shared data meets a threshold.

18. In a multiprocessing computer system having a plurality of processing devices, a method for identifying processes to be executed, the method comprising:
   detecting an execution behavior pattern for processes that access shared data;
   determining if the execution behavior pattern statistically meets a threshold associated with patterns of access to the shared data, and if the execution behavior pattern statistically meets the threshold associated with patterns of access to the shared data, causing a synchronization subsystem responsible for controlling access to the shared data to perform an affinity-based wakeup locality successor selection process comprising:

detecting when a first process executing on a first processing device releases access to shared data;

in response to the first process releasing access to the shared data, attempting to identify a second process that:

i) formerly executed on the first processing device; and
ii) is awaiting access to the shared data; and providing, to a kernel responsible for selecting processes to execute amongst the plurality of processing devices, an identification of the second process as a process that is ready for execution in the multiprocessing computer system; and if the execution behavior pattern statistically does not meet the threshold associated with patterns of access to the share data, causing the kernel to perform a normal successor selection process for selection of processes to succeed each other during execution.

19. The method of claim 18 wherein detecting an execution behavior pattern for processes that access the shared data and determining if the execution behavior pattern statistically meets a threshold are performed periodically such that the multiprocessing computer system selects processes to succeed execution of other processes according to at least one of:

the normal successor selection process performed by the kernel;

the affinity based wakeup locality successor selection process performed by a synchronization subsystem that controls access to the shared data.

20. The method of claim 18 wherein detecting an execution behavior pattern for processes that access the shared data comprises:

calculating an amount of blocked acquire operations for access to the shared data that have occurred over a period of time, the blocked acquire operations performed by processes that attempt access to the shared data but that result in the process being blocked for access to the shared data by the synchronization scheduler; and wherein determining if the execution behavior pattern statistically meets a threshold associated with patterns of access to the shared data comprises:

determining if the amount of blocked acquire operations meets a threshold.

21. The method of claim 18 wherein detecting an execution behavior pattern for processes that access the shared data comprises:

calculating an average hold time for accesses to the shared data that have occurred over a period of time performed by processes that access to the shared data; and wherein determining if the execution behavior pattern statistically meets a threshold associated with patterns of access to the shared data comprises:

determining if the average hold time for accesses to the shared data meets a threshold.

22. A multiprocessing computer system comprising:

a plurality of processing devices each having at least one associated cache;

a memory system;

an interconnection mechanism coupling the memory system and the plurality of processing devices;

wherein the memory system is further encoded with a synchronization subsystem that operates to identify processes to be executed by performing the operations of:

detecting when a first process executing on a first processing device releases access to shared data, wherein the first processing device maintains at least a portion of the shared data accessed and released by the first process in a cache associated with the first processing device;

in response to the first process releasing access to the shared data, attempting to identify a second process that:

i) formerly executed on the first processing device; and
ii) is awaiting access to the shared data; and providing, to a kernel responsible for selecting processes to execute amongst the plurality of processing devices, an identification of the second process as a process that is ready for execution in the multiprocessing computer system;

in the kernel responsible for selecting processes to execute amongst the plurality of processing devices:

receiving the identification of the second process as a process that is ready for execution in the multiprocessing computer system;

applying an affinity-based process selection technique to select the second process as a next process to execute on the first processing device;

executing the second process on the first processing device by executing the second process to access the at least a portion of the shared data maintained in the cache associated with the first processing device, such that the first processing device does not have to access that at least a portion of the shared data from a main memory associated with the multiprocessing computer system.

23. The multiprocessing computer system of claim 22 wherein detecting when a first process executing on a first processing device releases access to shared data, attempting to identify a second process, and providing, to a kernel responsible for selecting processes to execute amongst the plurality of processing devices, an identification of the second process are performed by the synchronization subsystem that operates independently of the kernel to control access to the share data.

24. The multiprocessing computer system of claim 23 wherein the synchronization subsystem operates in a Java Virtual Machine encoded within the memory and that operates in the multiprocessing computer system.

25. The multiprocessing computer system of claim 22 wherein when the synchronization subsystem performs the operation of attempting to identify a second process that formerly executed on the first processing device and that is awaiting to access shared data, the synchronization subsystem performs the operation of:

reviewing execution state associated with respective blocked processes awaiting access to the shared data; and if the execution state of a blocked process indicates that the blocked process formerly executed on the first processing device, identifying that blocked process as the second process.

26. The multiprocessing computer system of claim 25 wherein if multiple blocked processes include associated execution histories that indicate each form executed on the first processing device, the synchronization subsystem performs the operation of identifying that blocked process as the second process by performing the operations of:

identifying, as the second process that is ready for execution in the multiprocessing computer system, a blocked process that is awaiting access to the shared data and that executed least recently as compared to other blocked processes awaiting access to the shared data.

27. The multiprocessing computer system of claim 25 wherein if multiple blocked processes include associated execution histories that indicate each form executed on the first processing device, the synchronization subsystem performs the operation of identifying that blocked process as the second process by performing the operations of:
identifying, as the second process that is ready for execution in the multiprocessing computer system, a blocked process that is awaiting access to the shared data and that executed most recently as compared to other blocked processes awaiting access to the shared data.

28. The multiprocessing computer system of claim 25 wherein:
if no blocked process has an associated execution state that indicates former execution on the first processing device, the synchronization subsystem performs the operation of performing an alternate blocked process selection technique to identify the second process as a process that is ready for execution in the multiprocessing computer system.

29. The multiprocessing computer system of claim 28 wherein when the synchronization subsystem performs the operation of performing an alternate blocked process selection technique to identify the second process as a process that is ready for execution in the multiprocessing computer system, the synchronization subsystem performs the operation of:
identifying, as the second process that is ready for execution in the multiprocessing computer system, a blocked process that is awaiting access to the shared data and that executed least recently as compared to other blocked processes awaiting access to the shared data.

30. The multiprocessing computer system of claim 29 wherein when the synchronization subsystem performs the operation of identifying, as the second process that is ready for execution in the multiprocessing computer system, a blocked process that is awaiting access to the shared data and that executed least recently as compared to other blocked processes awaiting access to the shared data, the synchronization subsystem performs the operation of:
applying a forcible migration technique to the identified blocked process that has an execution state indicating that the blocked process executed formerly on a processing device other than the first processing device to cause the identified blocked process to migrate to the first processing device when executed by the kernel and to be identified to the kernel as the second process for execution on the first processing device.

31. The multiprocessing computer system of claim 28 wherein when the synchronization subsystem performs the operation of performing an alternate blocked process selection technique to identify the second process as a process that is ready for execution in the multiprocessing computer system, the synchronization subsystem performs the operation of:
applying a forcible migration technique to at least one blocked process that has an execution state indicating that the blocked process executed formerly on a processing device other than the first processing device and that is awaiting access to the shared data to cause the at least one blocked process to migrate to the first processing device when executed by the kernel and to be identified to the kernel as the second process for execution on the first processing device.

32. The multiprocessing computer system of claim 31 wherein the kernel responsible for selecting processes to execute amongst the plurality of processing devices performs the operations of:
detecting that the forcible migration technique has been applied to the at least one blocked process that has an execution state indicating that the blocked process executed most recently on a processing device other than the first processing device and that is awaiting access to the share data and in response, migrating the at least one blocked process for execution on the first processing device; and
applying a non-affinity-based process selection technique to select the at least one blocked process as a next process to execute on the first processing device.

33. The multiprocessing computer system of claim 22 wherein:
the plurality of processing devices includes at least two processing devices that share a common cache with each other;
the synchronization subsystem performs the operation of attempting to identify a second process that formerly executed on the first processing device and that is awaiting access to the shared data cannot identify a second process that formerly executed on the first processing device; and
wherein the synchronization subsystem performs the operation of attempting to identify the second process as a process that:
i) formerly executed at least one process of the at least two processors that share a common cache; and
ii) is awaiting access to the shared data.

34. The multiprocessing computer system of claim 33 wherein the at least two processing device that share a common cache with each other comprises different core processors on a common processing die.

35. The multiprocessing computer system of claim 22 wherein the synchronization subsystem performs the operation of:
detecting an execution behavior pattern for processes that access shared data; and
determining if the execution behavior pattern statistically meets a threshold associated with patterns of access to the shared data, and if the execution behavior pattern statistically meets the threshold associated with patterns of access to the shared data, the synchronization subsystem responsible for controlling access to the shared data to perform the operations of:
detecting when a first process executing on a first processing device releases access to shared data;
in response to the first process releasing access to the shared data, attempting to identify a second process that:
i) formerly executed on the first processing device; and
ii) is awaiting access to the shared data; and
providing, to a kernel responsible for selecting processes to execute amongst the plurality of processing devices, an identification of the second process as a process that is ready for execution in the multiprocessing computer system; and
if the execution behavior pattern statistically does not meet the threshold associated with patterns of access to the share data, the synchronization subsystem causes the kernel to perform a normal successor selection process for selection of processes to succeed each other during execution.

36. The multiprocessing computer system of claim 35 wherein when the synchronization subsystem performs the operations of detecting an execution behavior pattern for processes that access the shared data and determining if the execution behavior pattern statistically meets a threshold, the synchronization subsystem performs these operations periodically such that the multiprocessing computer system selects processes to succeed execution of other processes according to at least one of:

the normal successor selection process performed by the kernel;

the affinity based wakeup locality successor selection process performed by a synchronization subsystem that controls access to the share data.

37. The multiprocessing computer system of claim 35 wherein when the synchronization subsystem performs the operation of detecting an execution behavior pattern for processes that access the shared data, the synchronization subsystem performs the operations of:

calculating an amount of blocked acquire operations for access to the shared data that have occurred over a period of time, the blocked acquire operations performed by processes that attempt access to the shared data but that result in the process being blocked for access to the shared data by the synchronization scheduler; and wherein when the synchronization subsystem performs the operation of determining if the execution behavior pattern statistically meets a threshold associated with patterns of access to the shared data, the synchronization subsystem performs the operation of:

determining if the amount of blocked acquire operations meets a threshold.

38. The multiprocessing computer system of claim 35 wherein when the synchronization subsystem performs the operation of detecting an execution behavior pattern for processes that access the shared data the synchronization subsystem performs the operation of:

calculating an average hold time for accesses to the shared data that have occurred over a period of time performed by processes that access to the shared data; and wherein when the synchronization subsystem performs the operation of determining if the execution behavior pattern statistically meets a threshold associated with patterns of access to the shared data, the synchronization subsystem performs the operation of:

determining if the average hold time for accesses to the shared data meets a threshold.

39. A multiprocessing computer system comprising:

a plurality of processing devices each having at least one associated cache;

a memory system;

an interconnection mechanism coupling the memory system and the plurality of processing devices;

wherein the memory system is encoded with a synchronization subsystem that operates to identify processes to be executed by performing the operations of:

detecting an execution behavior pattern for processes that access shared data;

determining if the execution behavior pattern statistically meets a threshold associated with patterns of access to the shared data, and if the execution behavior pattern statistically meets the threshold associated with patterns of access to the shared data, the synchronization subsystem responsible for controlling access to the shared data performs an affinity-based wakeup locality successor selection process comprising the operations of:

detecting when a first process executing on a first processing device releases access to shared data;

in response to the first process releasing access to the shared data, attempting to identify a second process that:

i) formerly executed on the first processing device; and ii) is awaiting access to the shared data; and providing, to a kernel responsible for selecting processes to execute amongst the plurality of processing devices, an identification of the second process as a process that is ready for execution in the multiprocessing computer system; and if the execution behavior pattern statistically does not meet the threshold associated with patterns of access to the share data, the synchronization subsystem causes the kernel to perform a normal successor selection process for selection of processes to succeed each other during execution.

40. The multiprocessing computer system of claim 39 wherein detecting an execution behavior pattern for processes that access the shared data and determining if the execution behavior pattern statistically meets a threshold are performed periodically by the synchronization subsystem such that the multiprocessing computer system selects processes to succeed execution of other processes according to at least one of:

the normal successor selection process performed by the kernel;

the affinity based wakeup locality successor selection process performed by a synchronization subsystem that controls access to the shared data.

41. The multiprocessing computer system of claim 39 wherein when the synchronization subsystem performs the operation of detecting an execution behavior pattern for processes that access the shared data the synchronization subsystem performs the operation of:

calculating an amount of blocked acquire operations for access to the shared data that have occurred over a period of time, the blocked acquire operations performed by processes that attempt access to the shared data but that result in the process being blocked for access to the shared data by the synchronization scheduler; and wherein when the synchronization subsystem performs the operation of determining if the execution behavior pattern statistically meets a threshold associated with patterns of access to the shared data, the synchronization subsystem performs the operation of:

determining if the amount of blocked acquire operations meets a threshold.

42. The multiprocessing computer system of claim 39 wherein when the synchronization subsystem performs the operation of detecting an execution behavior pattern for processes that access the shared data, the synchronization subsystem performs the operation of:

calculating an average hold time for accesses to the shared data that have occurred over a period of time performed by processes that access to the shared data; and wherein determining if the execution behavior pattern statistically meets a threshold associated with patterns of access to the shared data comprises:

determining if the average hold time for accesses to the shared data meets a threshold.

43. A multiprocessing computer system comprising:
a plurality of processing devices each having at least one associated cache;
a memory system;
an interconnection mechanism coupling the memory system and the plurality of processing devices;
wherein the memory system is encoded with a synchronization subsystem that operates to provide a means to identify processes to be executed, such means including:
means for detecting an execution behavior pattern for processes that access shared data;
means for determining if the execution behavior pattern statistically meets a threshold associated with patterns of access to the shared data, and if the execution behavior pattern statistically meets the threshold associated with patterns of access to the shared data, the synchronization subsystem responsible for controlling access to the shared data performs an affinity-based wakeup locality successor selection process that includes:
means for detecting when a first process executing on a first processing device releases access to shared data;
means for in response to the first process releasing access to the shared data, attempting to identify a second process that:
i) formerly executed on the first processing device; and
ii) is awaiting access to the shared data; and
means for providing, to a kernel responsible for selecting processes to execute amongst the plurality of processing devices, an identification of the second process as a process that is ready for execution in the multiprocessing computer system; and
if the execution behavior pattern statistically does not meet the threshold associated with patterns of access to the share data, the synchronization subsystem includes a means for causing the kernel to perform a normal successor selection process for selection of processes to succeed each other during execution.

44. A computer program product having a computer-readable storage medium including computer program logic encoded thereon that, when performed in a multiprocessing computer system identifies processes to be executed via the operations of:
detecting when a first process executing on a first processing device releases access to shared data, wherein the first processing device maintains at least a portion of the shared data accessed and released by the first process in a cache associated with the first processing device;
in response to the first process releasing access to the shared data, attempting to identify a second process that:
i) formerly executed on the first processing device; and
ii) is awaiting access to the shared data; and
providing, to a kernel responsible for selecting processes to execute amongst the plurality of processing devices, an identification of the second process as a process that is ready for execution in the multiprocessing computer system;
in the kernel responsible for selecting processes to execute amongst the plurality of processing devices:
receiving the identification of the second process as a process that is ready for execution in the multiprocessing computer system;
applying an affinity-based process selection technique to select the second process as a next process to execute on the first processing device;
executing the second process on the first processing device by executing the second process to access the at least a portion of the shared data maintained in the cache associated with the first processing device, such that the first processing device does not have to access that at least a portion of the shared data from a main memory associated with the multiprocessing computer system.

45. A computer program product having a computer-readable storage medium including computer program logic encoded thereon that, when performed in a multiprocessing computer system identifies processes to be executed via the operations of:
detecting an execution behavior pattern for processes that access shared data;
determining if the execution behavior pattern statistically meets a threshold associated with patterns of access to the shared data, and if the execution behavior pattern statistically meets the threshold associated with patterns of access to the shared data, causing a synchronization subsystem responsible for controlling access to the shared data to perform an affinity-based wakeup locality successor selection process comprising:
detecting when a first process executing on a first processing device releases access to shared data;
in response to the first process releasing access to the shared data, attempting to identify a second process that:
i) formerly executed on the first processing device; and
ii) is awaiting access to the shared data; and
providing, to a kernel responsible for selecting processes to execute amongst the plurality of processing devices, an identification of the second process as a process that is ready for execution in the multiprocessing computer system; and
if the execution behavior pattern statistically does not meet the threshold associated with patterns of access to the share data, causing the kernel to perform a normal successor selection process for selection of processes to succeed each other during execution.

* * * * *